Jan. 7, 1930.  J. D. WEATHERSBY  1,742,978
COFFEE ROASTER
Original Filed June 29, 1927   5 Sheets-Sheet 1

J. D. Weathersby
INVENTOR
BY Victor J. Evans
ATTORNEY

Jan. 7, 1930.  J. D. WEATHERSBY  1,742,978
COFFEE ROASTER
Original Filed June 29, 1927  5 Sheets-Sheet 5

J. D. Weathersby INVENTOR
BY Victor J. Evans
ATTORNEY

Patented Jan. 7, 1930

1,742,978

UNITED STATES PATENT OFFICE

JEFF D. WEATHERSBY, OF NEW ORLEANS, LOUISIANA

COFFEE ROASTER

Refiled for abandoned application Serial No. 202,414, filed June 29, 1927. This application filed April 13, 1929. Serial No. 354,965.

This invention relates to a coffee roaster, and is in common with the subject of my application filed June 29, 1927, Serial No. 202,414, and which was abandoned for failure to pay the final fee, the general object of the present invention being to provide a casing having upper and lower cylinders therein, each provided with spirals for causing the coffee to pass back and forth in the cylinders, with means for heating the lower cylinder to roast the coffee therein and with means for preheating the coffee in the upper cylinder from the heated air passing through the lower cylinder, said upper cylinder acting to clean the coffee of trash and the like so that the coffee in this cylinder is cleaned and heated before being passed to the lower cylinder where it is roasted.

Another object of the invention is to provide a tray for catching the trash and the like dropping from the upper cylinder, said tray being so arranged that the trash will not be burned and therefore prevent the coffee being injured by the fumes from the trash as it would if the trash were burned.

A still further object of the invention is to provide means for carrying off steam and the like from the roasting cylinder when the roasting has been checked by spraying the beans with water and to prevent these vapors from coming in contact with the coffee in the upper cylinder.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts through the several views, and in which:—

Figure 1:
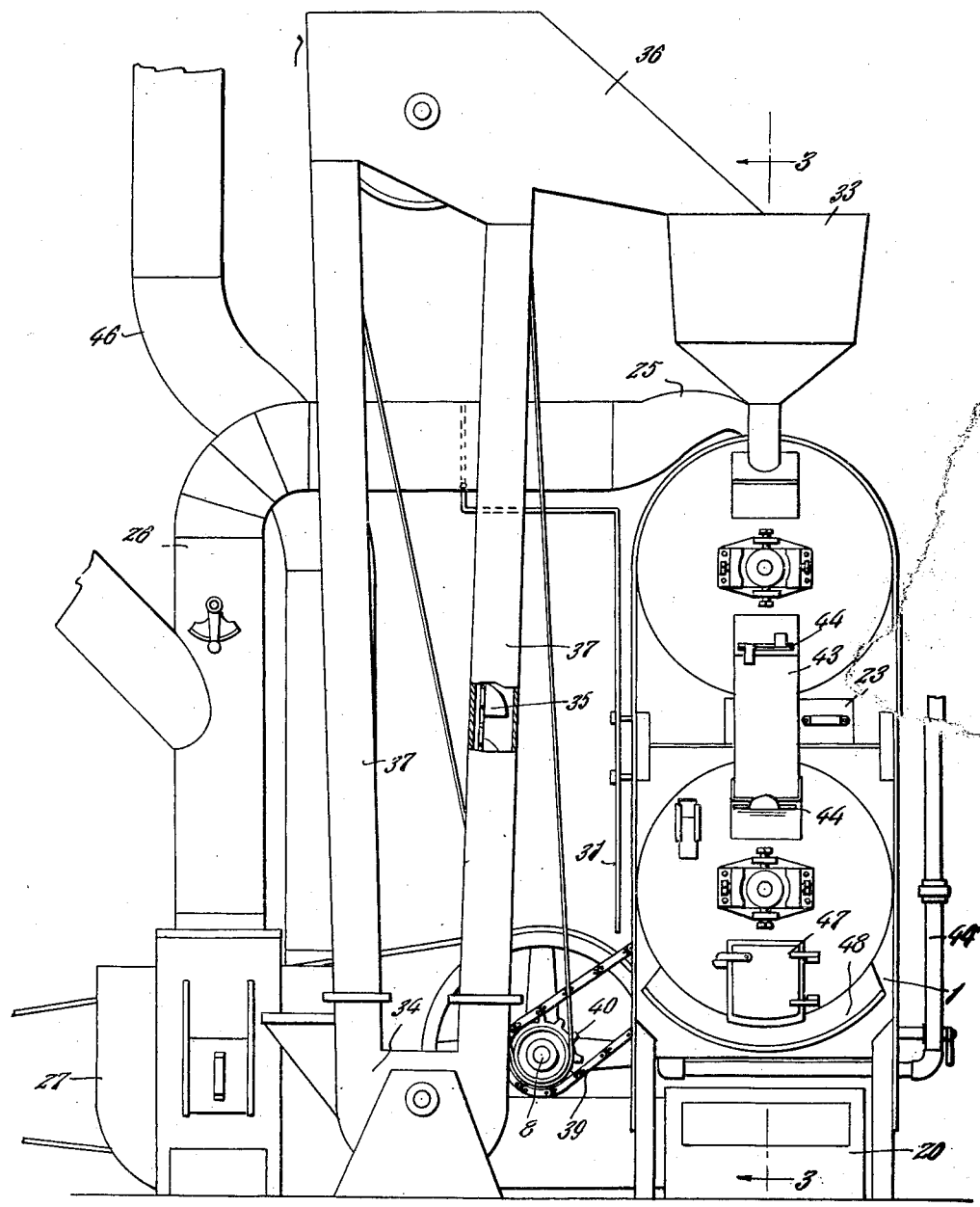
Figure 1 is a front view of the apparatus.
Figure 2:
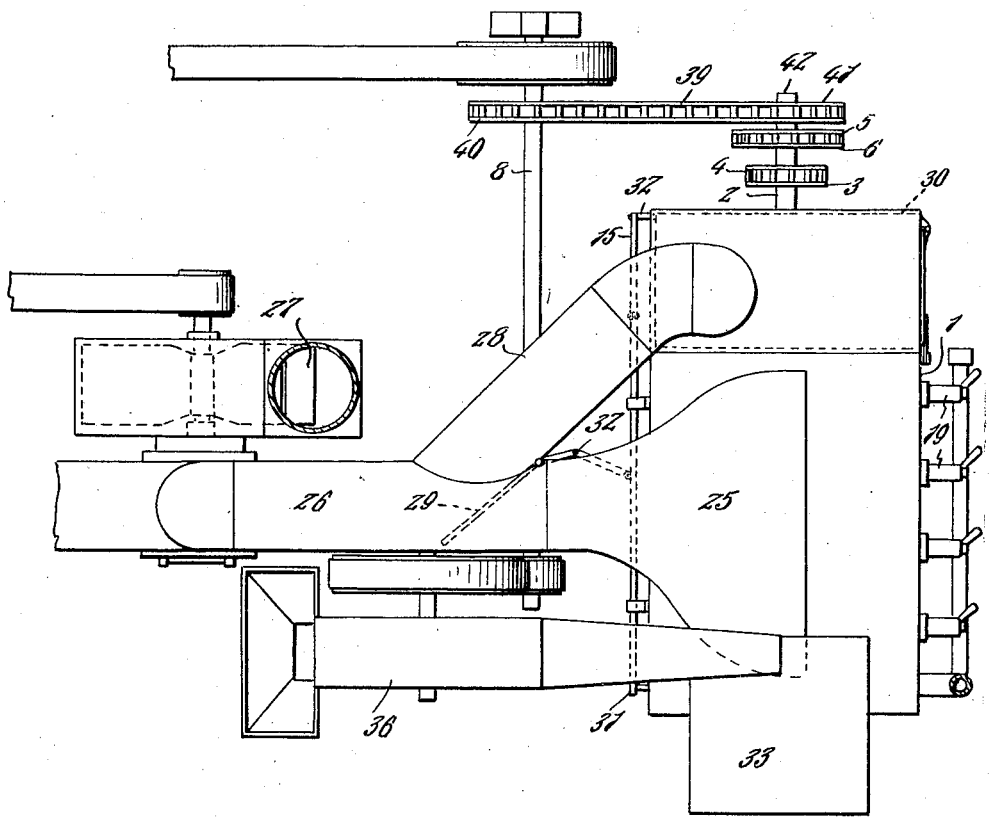
Figure 2 is a top plan view.
Figure 3:
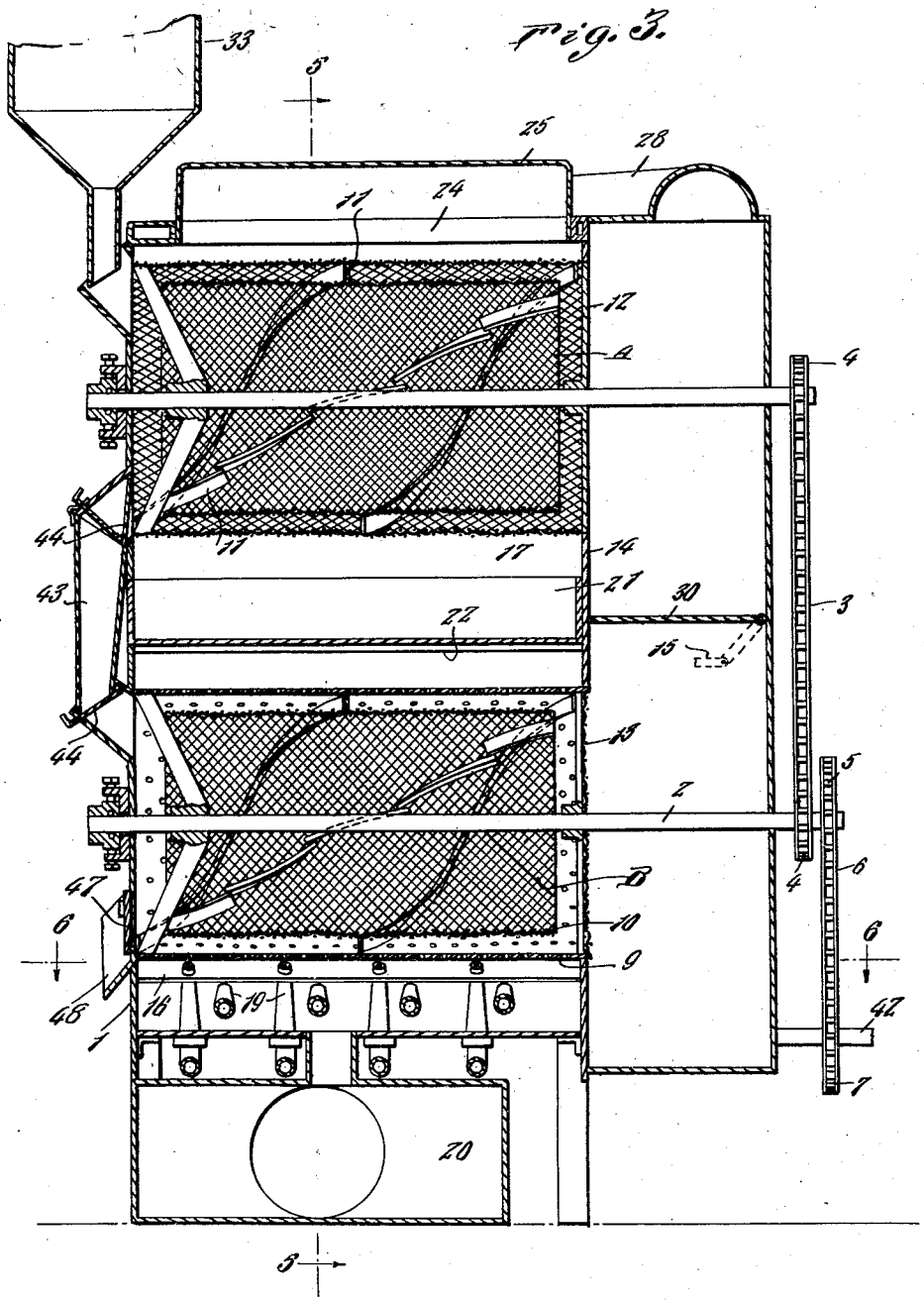
Figure 3 is a section on line 3—3 of Figure 1.
Figure 4:
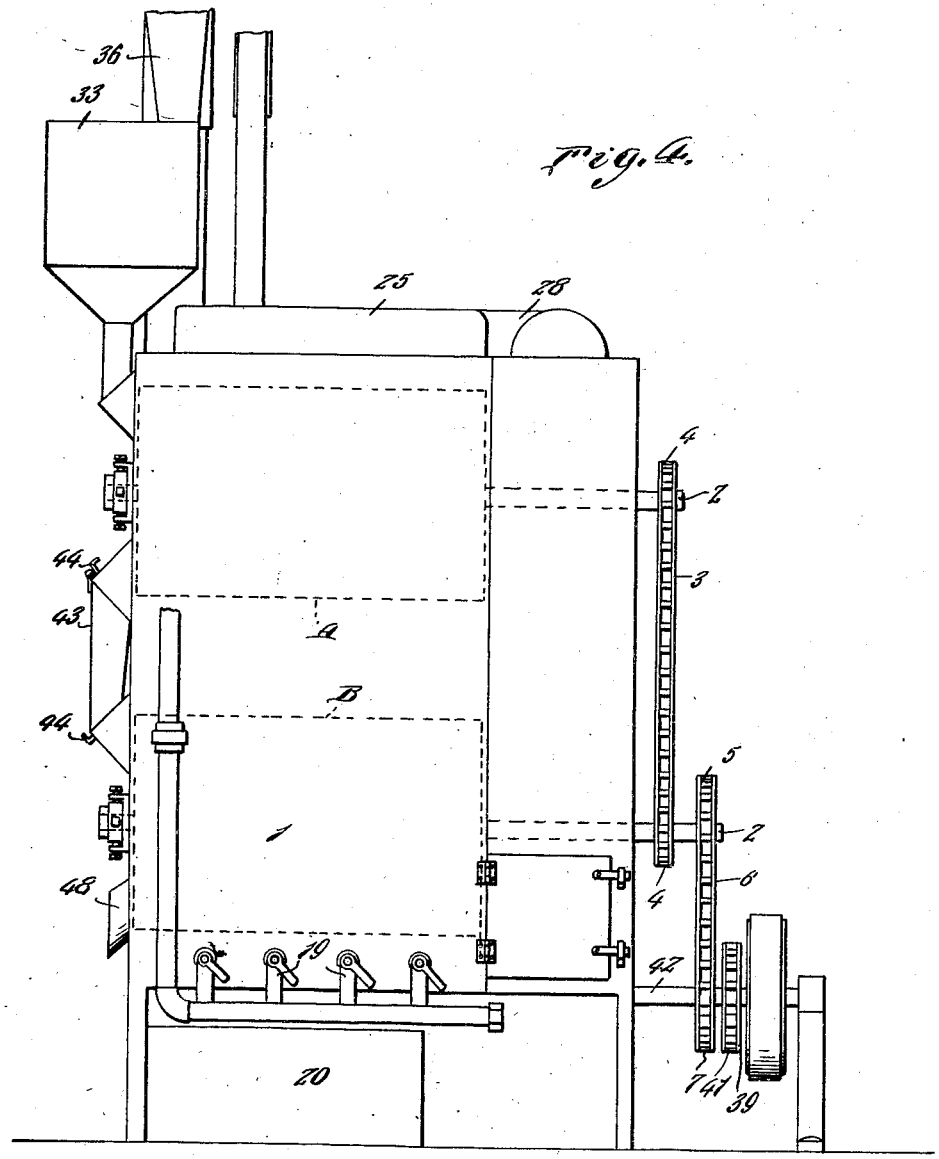
Figure 4 is a side view.
Figure 5:
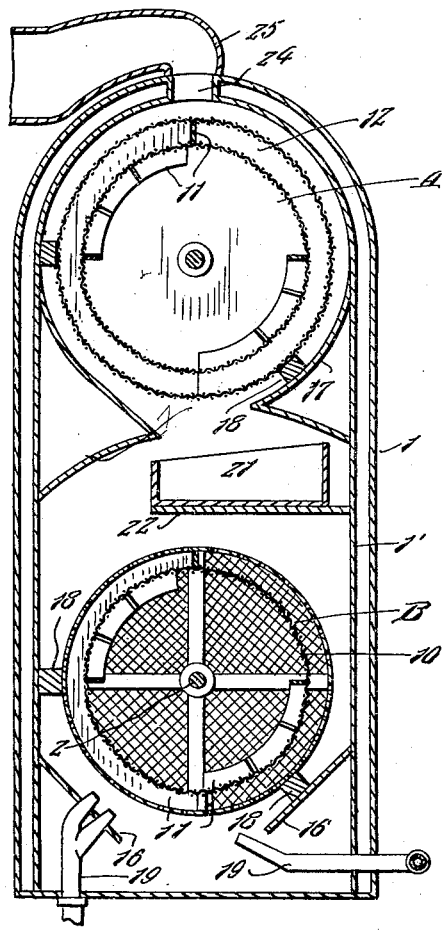
Figure 5 is a section on line 5—5 of Figure 3.
Figure 6:
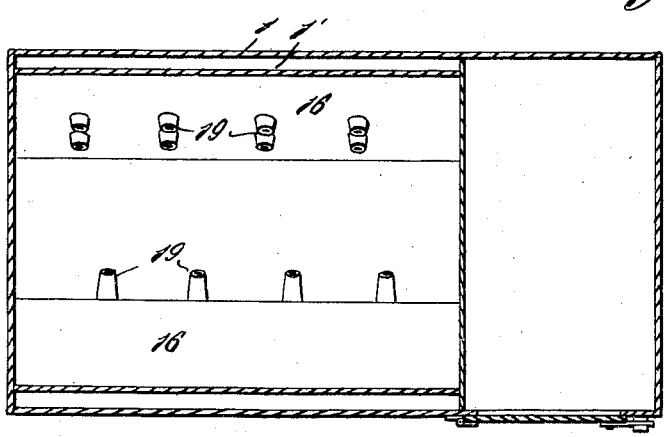
Figure 6 is a section on line 6—6 of Figure 3.

In these drawings, 1 indicates a casing in which is arranged the upper cylinder A and the lower cylinder B, each cylinder being fastened to a shaft 2 journaled in the casing and connected together by the chain 3 passing over the sprockets 4 on the projecting rear ends of the shafts. The shaft of the lower cylinder has a sprocket 5 thereon over which passes a chain 6 which also passes over a sprocket 7 on a driven shaft 8. Each cylinder is composed of an outer member 9 and an inner member 10 which are spaced apart, the inner member being of shorter length than the outer member and each member has connected with its interior a spiral 11. The members and their spirals are so arranged that the coffee is caused to move back and forth in the cylinder as the same is rotated. The rear end of the upper cylinder is closed by an imperforate end piece 12 while the rear end of the lower cylinder is formed of wire gauze 13. The upper cylinder is composed of square wire mesh which has a rough surface so that it will remove foreign matter from the coffee beans and polish the beans while the lower cylinder is constructed of perforated metal.

A partition 14 is vertically arranged in the casing and has holes therein which are occupied by the rear ends of the cylinders. This partition forms a chamber 15 at the rear of the casing with which the lower cylinder is in communication through means of the wire mesh end 13. The casing is provided with inner side walls 1' which are spaced from the outer wall and diagonally arranged baffle plates 16 extend downwardly from these inner walls adjacent the lower part of the lower cylinder. Substantially V-shaped baffle members 17 extend inwardly from the inner walls adjacent the lower part of the upper cylinder and strips 18 are carried by some of these baffle members and by one of the inner walls of the casing, these strips extending inwardly and engaging the sides of the cylinders to prevent heated air from passing around the cylinders and causing it to pass through the cylinders.

Burners 19 are arranged in the lower part of the casing for heating the air entering the bottom of the casing from the drum 20 arranged below the casing and a tray 21 is placed on a shelf 22 under the upper cylinder for receiving the trash and other matter removed from the coffee beans and dropping through the upper cylinder. As will be seen, this tray is located so that its contents will not be burned by the heat from the burners, and a door 23 in the front of the casing permits access to the tray to remove the same. An opening 24 is formed in the top of the casing and a hood 25 covers the opening, this hood being connected by a pipe 26 with the inlet of a power driven fan 27. A branch pipe 28 connects the top of the chamber 15 with the pipe 26. A damper 29 is arranged in the pipe 26 in rear of the junction of the pipe 28 therewith and a damper 30 is arranged in the chamber 15 for closing the lower part of the chamber from the upper part thereof. These dampers are connected with an operating rod 31 by the links 32 in such a manner that when the rod is moved, one damper will be closed and the other opened. Thus the lower part of the chamber will be cut off from the suction of the fan when the top part of the casing is in communication with the fan and vice versa.

A hopper 33 is provided at the top of the casing for delivering the coffee into the upper cylinder and coffee is fed to the hopper from a receiver 34 through means of the bucket conveyor 35 which deposits the coffee in a chute 36 which delivers the coffee into the hopper, the bucket conveyor being enclosed in the casings 37 and the conveyor is driven from the power shaft 8 by means of the endless chain 39 passing over the sprocket 40 on the power shaft and over a sprocket 41 connected with the shaft 42 journaled in the chute 36 and said shaft 42 has a sprocket thereon over which the conveyor passes. A chute 43 is arranged to cause the coffee to pass from the upper cylinder to the lower cylinder, this chute being provided with the gates 44 to control the passage of the coffee therethrough. Gas is led to the burners from a suitable source of supply through the pipes 45.

From the foregoing it will be seen that coffee beans placed in the receiver 34 are lifted into the chute 36 by the conveyor 35 and from this chute the beans pass into the hopper 33 and from the hopper into the top cylinder. As before stated, the coffee beans are caused to pass back and forth in this cylinder so that foreign matter is removed from them and they are polished and they are also preheated by air passing up through the casing from the lower part thereof, this air passing out through the opening 24 into the hood 25 and being discharged by the fan through the discharge pipe 46. After the coffee beans have been sufficiently treated in the upper cylinder, the gates 44 are opened so that the beans will pass through the trough 43 into the lower cylinder and then a new supply of beans is placed in the upper cylinder so that these beans are being treated in the upper cylinder as the beans previously treated in said cylinder are being roasted in the lower cylinder. The beans in the lower cylinder are caused to pass back and forth by the spirals and when the beans have been roasted to the desired degree, the rod 31 is moved to close the damper 29, thus shutting off the suction at the top of the casing and opening the damper 30 so that a suction is created in the chamber 15 by the fan. Water is then applied to the beans in the lower cylinder to check the roasting action and all smoke, steam, etc. will be drawn from said lower cylinder into the chamber 15 and it will pass from said cylinder through the branch 28 into pipe 26 and thus be drawn off by the fan. Thus this smoke, steam, etc. is prevented from coming in contact with the beans being treated in the upper cylinder. Then the door 47 in the front of the casing is opened so that the roasted beans will pass from the lower cylinder and be discharged by the chute 48 into a container placed to receive them. The rod is then actuated to close the damper 30 and open the damper 29 and then the coffee is passed from the upper cylinder into the lower cylinder and a new supply of beans placed in the upper cylinder.

As before stated, the trash dropping through the upper cylinder is caught in the tray 21, and by positioning this tray as shown, there is no danger of the trash therein being burned by the heat from the burners which would be apt to injure the coffee in the top cylinder.

As will be seen, the coffee is preheated so that some of its moisture is removed by the heat used to roast the coffee in the roasting cylinder and the steam, due to spraying water on the roasted coffee, is prevented from coming in contact with the beans in the upper cylinder by causing the steam to pass into the chamber 15 and closing the upper end of the casing to the suction of the fan.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A device of the class described comprising a casing, upper and lower cylinders therein formed of perforated material, means for rotating the cylinders, means for causing the beans in the cylinders to move back and forth therein, burners in the lower part of the casing for roasting the beans in the lower cylinder, the air heated by the burners passing upwardly to heat the beans in the upper cylinder, a tray for catching the waste material passing through the upper cylinder, means for causing the beans from the upper cylinder to pass into the lower cylinder when desired and discharge means for the lower cylinder.

2. A device of the class described comprising a casing, upper and lower cylinders therein formed of perforated material, means for rotating the cylinders, means for causing the beans in the cylinders to move back and forth therein, burners in the lower part of the casing for roasting the beans in the lower cylinder, the air heated by the burners passing upwardly to heat the beans in the upper cylinder, a tray for catching the waste material passing through the upper cylinder, means for causing the beans from the upper cylinder to pass into the lower cylinder when desired, discharge means for the lower cylinder, a suction device connected with the top of the casing, means for connecting said device with the interior of the lower cylinder and valve means for closing the suction to the casing and opening it to the lower cylinder and vice versa.

3. A device of the class described comprising a casing, upper and lower cylinders therein formed of perforated material, means for rotating the cylinders, means for causing the beans in the cylinders to move back and forth therein, burners in the lower part of the casing for roasting the beans in the lower cylinder, the air heated by the burners passing upwardly to heat the beans in the upper cylinder, a tray for catching the waste material passing through the upper cylinder, means for causing the beans from the upper cylinder to pass into the lower cylinder when desired, discharge means for the lower cylinder, a suction device connected with the top of the casing, means for connecting said device with the interior of the lower cylinder, valve means for closing the suction to the casing and opening it to the lower cylinder and vice versa, a hopper for delivering beans into the upper cylinder, a receiver for the beans and conveying means for conveying the beans from the receiver into the hopper.

4. A device of the class described comprising a casing, a partition vertically arranged therein and forming a cylinder chamber and a suction chamber, a suction device connected with the top of the chamber and with the top of the casing, a damper in said suction chamber, a damper in the connection between the suction device and the top of the casing, means for closing one damper and opening the other and vice versa, an upper cylinder and a lower cylinder journaled in the casing, the rear end of the lower cylinder being perforated and arranged in an opening formed in the partition, the walls of the cylinders being formed of perforated material, spirals in the cylinders for causing beans placed therein to move back and forth as the cylinders are rotated, means for rotating the cylinders, burners at the lower part of the casing for roasting the beans in the lower cylinder and for heating the beans in the upper cylinder when the damper in the connecting means is open and the damper in the chamber is closed, a chute for leading the beans from the upper cylinder into the lower cylinder, a gate in said chute, and a tray located under the upper cylinder for catching the trash removed from the coffee in the upper cylinder.

In testimony whereof I affix my signature.

JEFF D. WEATHERSBY.